(12) United States Patent
Murphy

(10) Patent No.: US 9,660,908 B2
(45) Date of Patent: May 23, 2017

(54) METHOD AND APPARATUS FOR PROCESSING UDP DATA PACKETS

(71) Applicant: The Boeing Company, Chicago, IL (US)

(72) Inventor: Brandon M. Murphy, Huntsville, AL (US)

(73) Assignee: THE BOEING COMPANY, Chicago, IL (US)

( * ) Notice: Subject to any disclaimer, the term of this patent is extended or adjusted under 35 U.S.C. 154(b) by 130 days.

(21) Appl. No.: 14/524,546

(22) Filed: Oct. 27, 2014

(65) Prior Publication Data
US 2016/0119232 A1   Apr. 28, 2016

(51) Int. Cl.
| | | |
|---|---|---|
| H04L 12/953 | (2013.01) | |
| H04L 12/741 | (2013.01) | |
| H04L 12/801 | (2013.01) | |
| H04L 12/26 | (2006.01) | |
| G06F 11/32 | (2006.01) | |

(52) U.S. Cl.
CPC .......... *H04L 45/74* (2013.01); *H04L 43/0835* (2013.01); *H04L 47/34* (2013.01); *G06F 11/321* (2013.01); *H04L 43/0829* (2013.01)

(58) Field of Classification Search
CPC ...... G06F 11/321; G06F 11/323; H04L 43/00; H04L 43/02; H04L 43/04; H04L 43/05; H04L 43/06; H04L 43/08; H04L 43/0829; H04L 43/0835; H04L 43/0847; H04L 47/34

See application file for complete search history.

(56) References Cited

U.S. PATENT DOCUMENTS

| | | | |
|---|---|---|---|
| 8,806,550 B1* | 8/2014 | Chan | H04N 17/004 725/100 |
| 2014/0208420 A1* | 7/2014 | Mraz | H04L 63/1408 726/22 |
| 2015/0089332 A1* | 3/2015 | Chambers | H03M 13/6306 714/807 |

OTHER PUBLICATIONS

The Western Aeronautical Test Range Chapter 10 Tools by Knudtson, Park, Downing, Sheldon, Harvey, and Norcross Oct. 2011 http://hdl.handle.net/10150/595770.*
Wikipedia's Real-time Transport Protocol historical version from Oct. 26, 2014 https://en.wikipedia.org/w/index.php?title=Real-time_Transport_Protocol&oldid=631149743.*
Wikipedia's User Datagram Protocol historical version from Oct. 14, 2014 https://en.wikipedia.org/w/index.php?title=User_Datagram_Protocol&oldid=629553402.*
Wireshark User's Guide historical version from Apr. 14, 2014, found via the WayBack Machine https://web.archive.org/web/20140414172055/https://www.wireshark.org/docs/wsug_html/.*
Sourceforge messageboard postings by Bob Baggerman relevant postings from Dec. 29, 2012 and Mar. 9, 2010 https://sourceforge.net/p/irig106/mailman/irig106-announce/?limit=100.*

(Continued)

*Primary Examiner* — Joseph Schell
(74) *Attorney, Agent, or Firm* — Yee & Associates, P.C.

(57) ABSTRACT

A method and apparatus for processing a plurality of data packets. A data packet is received. A determination is made as to whether a portion of the data packet follows a selected digital recorder standard protocol based on a header of the data packet. Raw data in the data packet is converted into human-readable information in response to a determination that the portion of the data packet follows the selected digital recorder standard protocol.

14 Claims, 10 Drawing Sheets

(56) References Cited

OTHER PUBLICATIONS

IRIG 106-07 Chapter 10 Programming Handbook by Telemtry Group Mar. 2009 http://www.irig106.org/docs/123-09/IRIG_106-07_Chapter_10_Programming_Handbook.pdf.*

Range Commanders Council, Telemetry Group, "Telemetry Standards (Part 1): Chapter 10—Digital Recording Standards," IRIG 106, RCC Document 106-07, Sep. 2007, 159 pages, accessed Oct. 22, 2014. http://www.irig106.org/docs/106-07/chapter10.pdf.

"Wireshark," Wikimedia Foundation, Inc., last updated Oct. 20, 2014, 5 pages, accessed Oct. 22, 2014. http://en.wikipedia.org/wiki/Wireshark.

Hoffman, "How to Use Wireshark to Capture, Filter and Inspect Packets." How-To Geek, LLC, Oct. 14, 2014, 8 pp., accessed Oct. 22, 2014. http://www.howtogeek.com/104278/how-to-use-wireshark-to-capture-filter-and-inspect-packets/.

* cited by examiner

METHOD AND APPARATUS FOR PROCESSING UDP DATA PACKETS

GOVERNMENT LICENSE RIGHTS

This application was made in the performance of work under NASA Contract No. NNM07AB03C and is subject to the provisions of Section 305 of the National Aeronautics and Space Act of 1958 (72 Stat. 435; 42 U.S.C. 2457). The United States Government has certain rights in this application.

BACKGROUND INFORMATION

1. Field

The present disclosure relates generally to processing data packets and, in particular, to processing data packets that follow a selected digital recorder standard protocol. Still more particularly, the present disclosure relates to a method and apparatus for converting binary data in data packets that follow a selected digital recorder standard protocol into human-readable information.

2. Background

Different types of information may be sent over a network using a series of data packets. For example, an email may be sent over a network as a series of data packets. A data packet is a formatted unit of data that travels over a network. The data packet may travel from a source to a destination. The structure of the data packet may depend on the type of the data packet and on the protocol associated with the data packet.

Typically, a data packet includes a header and a payload. The header may contain information about the data packet. For example, without limitation, the header of an Internet Protocol (IP) data packet may include a source Internet Protocol address, a destination Internet Protocol address, a sequence number, a type of service, and other types of information. The payload is the actual data that is being delivered to the destination. The information contained in a data packet may be in a raw format. In other words, the information may be in a binary format.

In some cases, it may be desirable to analyze the raw network traffic of data packets being received over a network at an interface. Wireshark may be an example of a free and open source packet analyzer used to analyze these types of data packets. Wireshark may allow data packets to be dissected. In other words, the data packets may be decoded and converted into human-readable information.

The information in a data packet may be formatted to follow any number of different protocols including, but not limited to, the Internet Protocol, the User Datagram Protocol (UDP), the Transmission Control Protocol (TCP), and other types of protocols. Multiple dissectors may be used to decode a data packet with each dissector capable of decoding the portion of the data packet following a protocol corresponding to that dissector.

Currently available dissectors may be unable to decode certain portions of data packets. For example, currently available dissectors may be unable to decode data packets that follow the Inter-Range Instrumentation Group (IRIG) Standard 106 protocol. The Inter-Range Instrumentation Group (IRIG) Standard 106 protocol is a digital recorder standard protocol. Consequently, some packet analyzers, such as Wireshark, may be unable to accurately analyze data packets received over a network and detect errors in the sequencing of these data packets. Therefore, it would be desirable to have a method and apparatus that take into account at least some of the issues discussed above, as well as other possible issues.

SUMMARY

In one illustrative embodiment, an apparatus comprises a decoder. The decoder converts raw data in a portion of a data packet that follows a selected digital recorder standard protocol into human-readable information.

In another illustrative embodiment, a method for processing a plurality of data packets is provided. A data packet is received. A determination is made as to whether a portion of the data packet follows a selected digital recorder standard protocol based on a header of the data packet. Raw data in the data packet is converted into human-readable information in response to a determination that the portion of the data packet follows the selected digital recorder standard protocol.

In yet another illustrative embodiment, a method for processing a plurality of data packets is provided. A data packet is received. A determination is made as to whether a portion of the data packet follows a selected digital recorder standard protocol based on a header of the data packet. Raw data in the header of the data packet is converted into human-readable header information in response to a determination that the portion of the data packet follows the selected digital recorder standard protocol. A determination is made as to whether an error has occurred based on the header of the data packet. An error indication is generated in response to a determination that the error has occurred.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account different considerations. For example, the illustrative embodiments recognize and take into account that it may be desirable to have a method and apparatus for analyzing data packets that follow a selected digital recorder standard protocol. In particular, it may be desirable to have a method and apparatus for analyzing data packets that follow the Inter-Range Instrumentation Group (IRIG) Standard 106 protocol. Still more particularly, it may be desirable to have a method and apparatus for analyzing data packets that follow the Chapter 10 protocol of the Inter-Range Instrumentation Group (IRIG) Standard 106.

Figure 1:
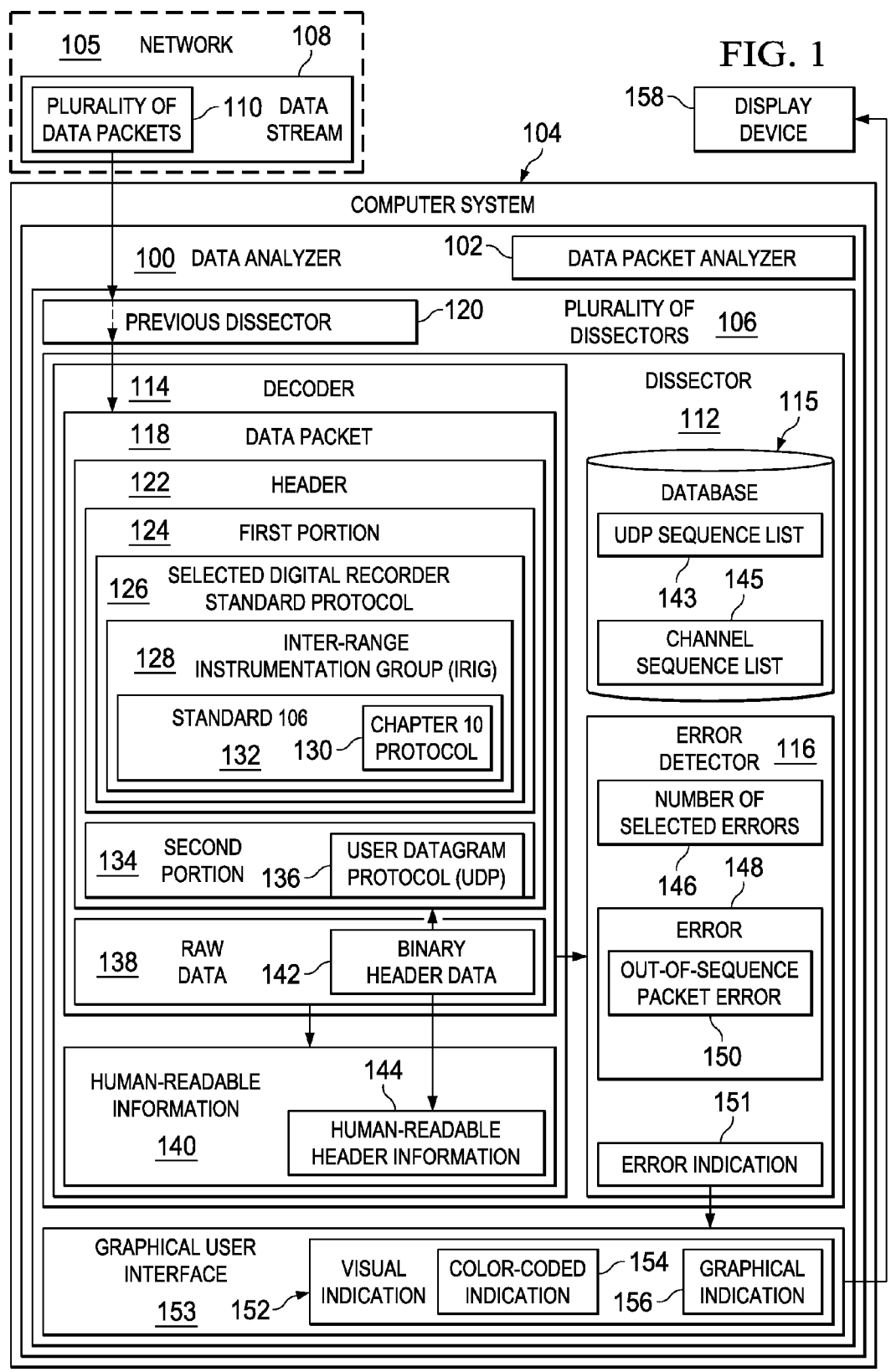
FIG. 1 is an illustration of a data analyzer in the form of a block diagram in accordance with an illustrative embodiment.

Referring now to the figures and, in particular, with reference to FIG. 1, an illustration of a data analyzer is depicted in the form of a block diagram in accordance with an illustrative embodiment. In this illustrative example, data analyzer 100 may be used to analyze data. Data analyzer 100 may also be referred to as data packet analyzer 102. In other cases, data analyzer 100 may be referred to as a packet analyzer.

Data analyzer 100 may be implemented using hardware, software, firmware, or some combination thereof. In this illustrative example, data analyzer 100 may be implemented using computer system 104. Computer system 104 may be comprised of one or more computers. When computer system 104 includes multiple computers, these computers may be in communication with each other.

Data analyzer 100 may process data that has been received over network 105. Data analyzer 100 may include plurality of dissectors 106. Each of plurality of dissectors 106 may correspond to a different protocol. Plurality of dissectors 106 may be used to decode data that is received over network 105.

For example, data stream 108 may be received over network 105. Data stream 108 may comprise plurality of data packets 110. Plurality of data packets 110 may be a series of data packets that are received as part of a sequence. In one illustrative example, data stream 108 may be received from a digital recorder onboard a platform, such as an aerospace vehicle or an aerospace platform. For example, data stream 108 may be received from a flight recorder, a digital video recorder, a space station digital recorder, a digital recorder onboard a rocket, a digital recorder onboard a missile, or some other type of digital recorder.

As depicted, plurality of dissectors 106 may include dissector 112 and previous dissector 120. In this illustrative example, dissector 112 may receive data packet 118 after previous dissector 120 has decoded another portion of data packet 118 that follows a protocol corresponding to previous dissector 120. Data packet 118 may include header 122 and a payload (not shown).

Dissector 112 may include decoder 114 and error detector 116. Each of decoder 114 and error detector 116 may be implemented using hardware, software, firmware, or a combination thereof. Decoder 114 may decode a portion of data packet 118 that follows selected digital recorder standard protocol 126. This portion of data packet 118 may include first portion 124 of header 122 of data packet 118. In this manner, decoder 114 may be used to decode first portion 124 of header 122 after previous dissector 120 has decoded another portion of data packet 118, which may include second portion 134 of header 122.

First portion 124 of header 122 may follow selected digital recorder standard protocol 126. Selected digital recorder standard protocol 126 may be defined by Inter-Range Instrumentation Group (IRIG) 128. In particular, selected digital recorder standard protocol 126 may be Chapter 10 protocol 130 of Standard 106 132 provided by Inter-Range Instrumentation Group 128. In this manner, dissector 112 may correspond to Chapter 10 protocol 130 of Standard 106 132 provided by Inter-Range Instrumentation Group 128.

Second portion 134 of header 122 may follow User Datagram Protocol (UDP) 136. Previous dissector 120 may correspond to User Datagram Protocol 136. In this manner, dissector 112 may receive data packet 118 only after previous dissector 120 corresponding to User Datagram Protocol 136 has decoded another portion of data packet 118 corresponding to User Datagram Protocol 136, which may include second portion 134 of header 122.

In these illustrative examples, decoder 114 may be configured to convert raw data 138 in data packet 118 that follows selected digital recorder standard protocol 126 into human-readable information 140. Raw data 138 may be binary data. Raw data 138 may include binary header data 142 in header 122 of data packet 118. In particular, decoder 114 may convert binary header data 142 into human-readable header information 144.

As decoder 114 decodes binary header data 142, decoder 114 may extract sequencing information from binary header data 142. In particular, decoder 114 may extract the User Datagram Protocol sequence number and the channel sequence number from binary header data 142 and add these numbers to User Datagram Protocol sequence list 143 and channel sequence list 145, respectively. User Datagram Protocol sequence list 143 and channel sequence list 145 may be stored in database 115.

Error detector 116 may evaluate data packet 118 to determine whether one of number of selected errors 146 has occurred. Number of selected errors 146 may include, for example, without limitation, at least one of a dropped packet error, an out-of-sequence packet error, or some other type of error.

As used herein, the phrase "at least one of," when used with a list of items, means different combinations of one or more of the listed items may be used and only one of the items in the list may be needed. The item may be a particular object, thing, action, process, or category. In other words, "at least one of" means any combination of items or number of items may be used from the list, but not all of the items in the list may be required.

For example, "at least one of item A, item B, or item C" or "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Error detector 116 may use User Datagram Protocol sequence list 143 and channel sequence list 145 stored in database 115 to determine whether one of number of selected errors 146 has occurred. As one illustrative example, error detector 116 may detect error 148. Error 148 may be, for example, out-of-sequence packet error 150. In response to detecting error 148, error detector 116 may generate error indication 151 that may then be processed by data analyzer 100.

For example, data analyzer 100 may use error indication 151 to generate visual indication 152 of error 148. Visual indication 152 may be displayed on display device 158 using graphical user interface 153. Visual indication 152 of error 148 may comprise at least one of color-coded indication 154, graphical indication 156, or some other type of indication. Color-coded indication 154 may be, for example, human-readable information 140 corresponding to data packet 118 for which error 148 was detected being displayed having a particular font color, background color, or both. Graphical indication 156 may be, for example, human-readable information 140 corresponding to data packet 118 for which error 148 was detected being displayed having a particular font style, being displayed as blinking, or being displayed in some other manner that allows error 148 to be identified by a user.

In other illustrative examples, visual indication 152 may be displayed with respect to a visualization of data packet 118 using graphical user interface 153. For example, a line in a window corresponding to data packet 118 may be color-coded or graphically altered in some way that distinguishes data packet 118 as being associated with error 148.

The illustration of data analyzer 100 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

Although dissector 112 is described as capable of converting raw data 138 in first portion 124 of header 122 into human-readable header information 144, dissector 112 may also be capable of converting raw data 138 in at least a portion of the payload of data packet 118 into human-readable information 140. Further, although database 115 is depicted separate from error detector 116 in FIG. 1, in other illustrative examples, database 115 may be considered part of error detector 116.

Still further, although decoder 114 and error detector 116 are depicted as separate within dissector 112 in FIG. 1, in other illustrative examples, error detector 116 may be considered part of decoder 114 or decoder 114 may be considered part of error detector 116. In some illustrative examples, graphical user interface 153 may be integrated as part of display device 158.

Figure 2:
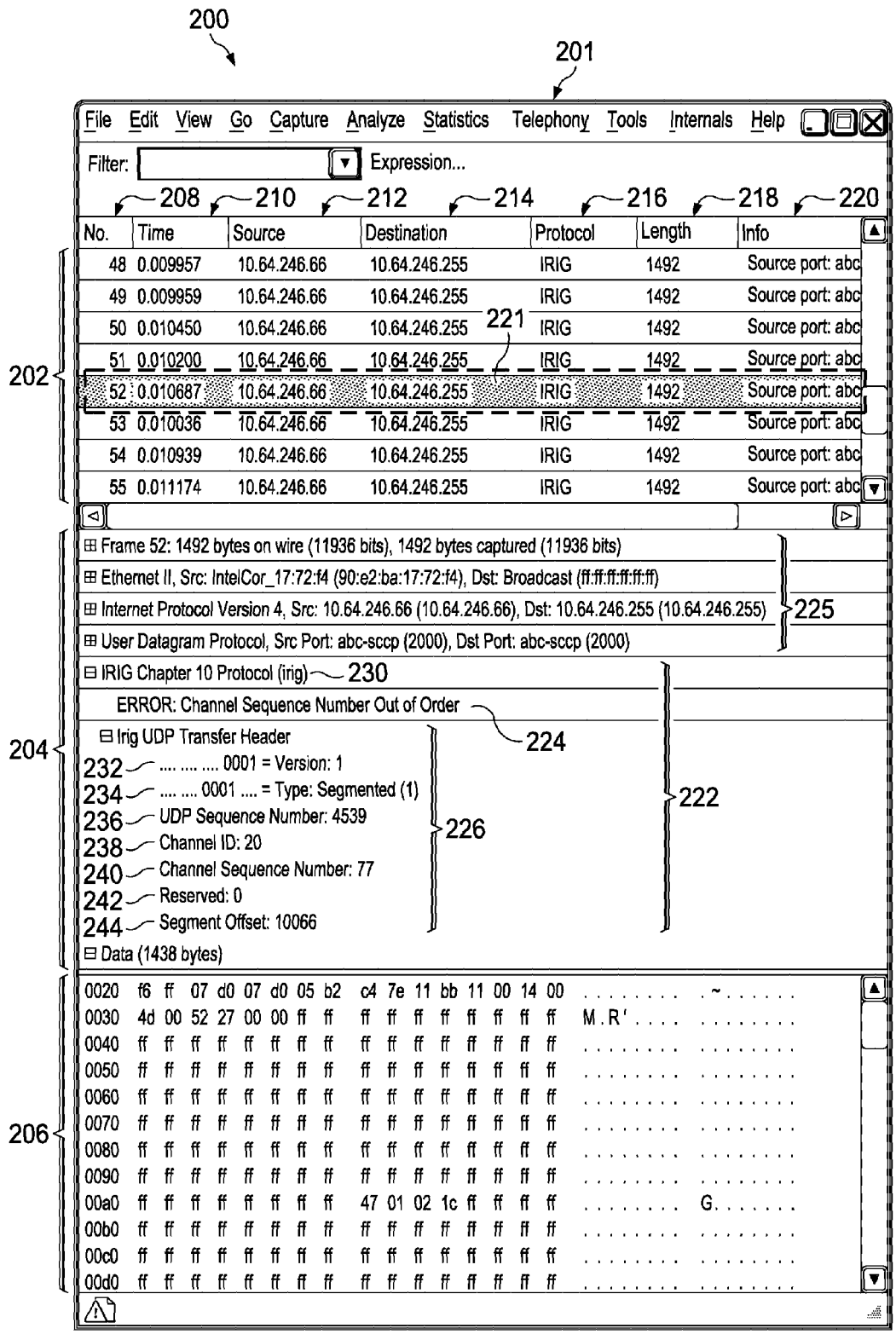
FIG. 2 is an illustration of a display of a graphical user interface associated with a data analyzer in accordance with an illustrative embodiment.

With reference now to FIG. 2, an illustration of a display of a graphical user interface associated with a data analyzer is depicted in accordance with an illustrative embodiment. In this illustrative example, display 200 may be of a graphical user interface associated with a data analyzer, such as graphical user interface 153 associated with data analyzer 100 in FIG. 1.

In this illustrative example, display 200 includes window 201. Within window 201, data packet section 202, human-readable section 204, and hexadecimal data section 206 are displayed. Data packet section 202 may display a listing of the various data packets analyzed and information about these data packets extracted from the headers of the data packets. As depicted, data packet section 202 displays index 208, time 210, source 212, destination 214, protocol 216, length 218, and information 220 about each of the data packets listed in data packet section 202.

Index 208 may be a unique identifier for each data packet. Time 210 may be the time at which the data packet was received. Source 212 may be the address of the source from which the data packet was received. Destination 214 may be the address of the destination of the data packet. The addresses for the source and destination may be Internet Protocol addresses in this illustrative example.

Protocol 216 may identify the encapsulated protocol followed by the data packet. As depicted, the data packets displayed in data packet section 202 follow the Inter-Range Instrumentation Group protocol, which may be the Chapter 10 protocol of the Inter-Range Instrumentation Group Standard 106. Length 218 may be a length of the payload of the data packet. Information 220 may include information about the source port from which the data packet was sent and the destination port at which the data packet was received.

In this illustrative example, data packet 221 has been selected. Based on this selection, the human-readable information generated for this data packet is displayed within human-readable section 204. For example, raw data in data packet 221 may have been decoded using a dissector, such as dissector 112 in FIG. 1, and converted into human-readable information 222.

As depicted in this example, human-readable information 222 may include, but is not limited to, protocol identification 230, error indication 224, and human-readable header information 226. Protocol identification 230 identifies that the portion of data packet 221 decoded follows the Chapter 10 Protocol of Standard 106 provided by the Inter-Range Instrumentation Group.

Error indication 224 may be an example of one implementation for error indication 151 in FIG. 1. As depicted, error indication 224 may be displayed in correspondence with the selection of data packet 221 in data packet section 202. Although error indication 224 is displayed as part of human-readable information 222 in this example, in other examples, error indication 224 may be displayed separate from human-readable information 222. Error indication 224 indicates that data packet 221 is an out-of-sequence packet error. In other words, data packet 221 was received out-of-sequence.

Human-readable header information 226 may include information obtained from the header of data packet 221. In particular, binary header data in data packet 221 may have been converted into human-readable header information 226. Human-readable header information 226 may be an example of one implementation for human-readable header information 144 in FIG. 1. As depicted, human-readable header information 226 may include, but is not limited to, version number 232, type 234, User Datagram Protocol sequence number 236, channel identifier 238, channel sequence number 240, reserved number 242, and segment offset 244.

Human-readable information 225 may be the information that was generated by dissectors that processed data packet 221 previous to the dissector corresponding to the Inter-Range Instrumentation Group protocol. As depicted, these previous dissectors decoded the portion of data packet 221 corresponding to the Ethernet protocol, the Internet Protocol, and the User Datagram Protocol. Without using a dissector, such as dissector 112 in FIG. 1, to decode the portion of the header in data packet 221 that follows the Chapter 10 Protocol of Standard 106 provided by the Inter-Range Instrumentation Group, human-readable section 204 would not include human-readable information 222 but would, instead, include only human-readable information 225.

Hexadecimal data section 206 may display the raw data in data packet 221 in a hexadecimal format. In particular, the data analyzer may convert binary data in data packet 221 into a hexadecimal format for display in hexadecimal data section 206.

Figure 3:
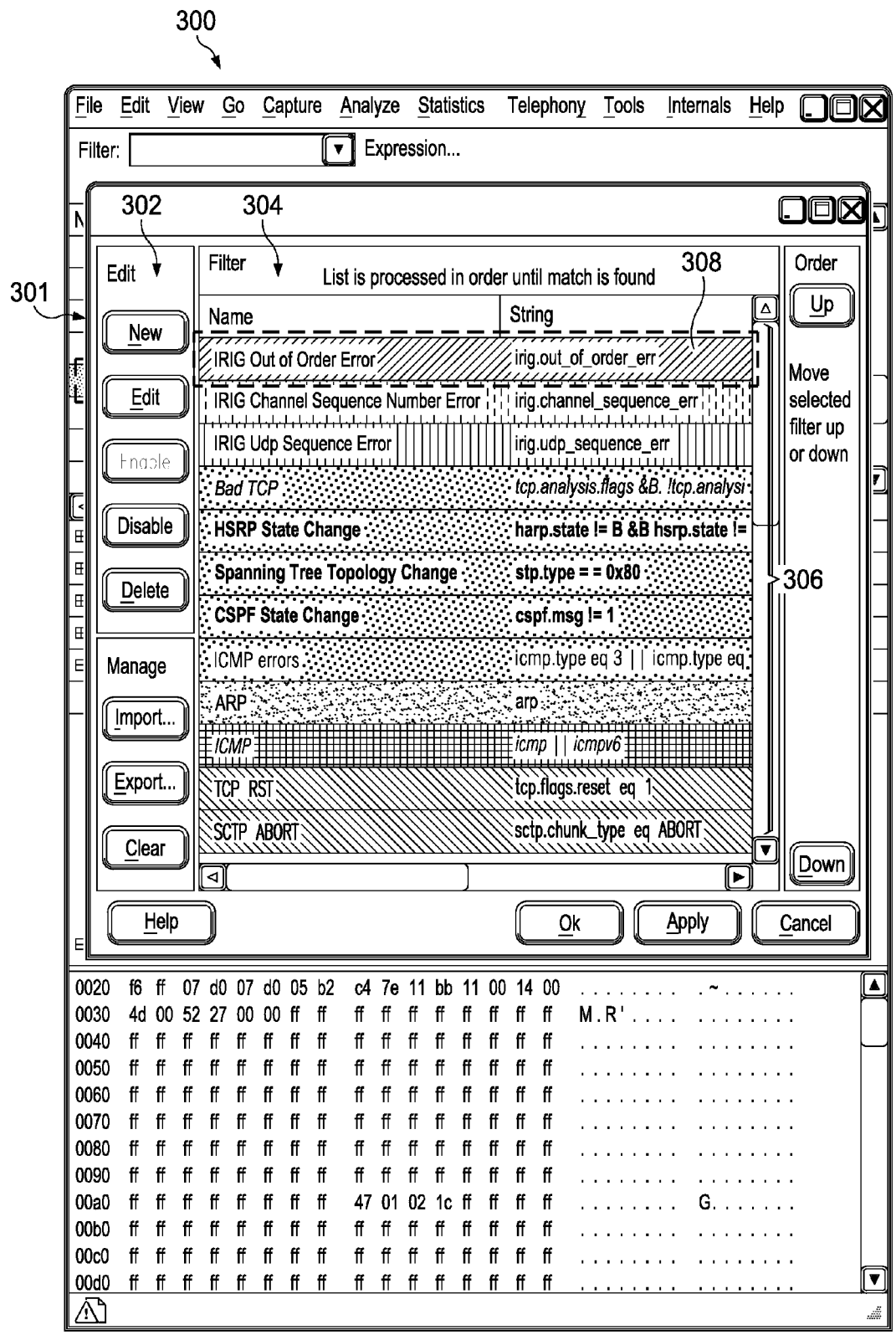
FIG. 3 is an illustration of a display of color-coding rules for a graphical user interface in accordance with an illustrative embodiment.

With reference now to FIG. 3, an illustration of a display of color-coding rules for a graphical user interface is depicted in accordance with an illustrative embodiment. In this illustrative example, display 300 may be of a graphical user interface associated with a data analyzer, such as graphical user interface 153 associated with data analyzer 100 in FIG. 1.

Window 301 may be similar to window 201 displayed in FIG. 2. As depicted, window 302 is displayed over window 301. Window 302 may allow color-coding rules to be added to the graphical user interface such that different types of information may be graphically-coded according to these graphical-coding rules.

List 304 of plurality of graphical-coding rules 306 displayed in window 302 may be dynamic. In other words, graphical-coding rules may be added to, removed from, or edited in list 304 of graphical-coding rules 306. Rule 308 may be an example of one of these graphical-coding rules. Rule 308 may be the graphic-coding rule by which information for data packets that are out of order, or out-of-sequence, are formatted. In other illustrative examples, list 304 of graphical-coding rules 306 may include color-coding rules that define, for example, font color and background color.

Figure 4:
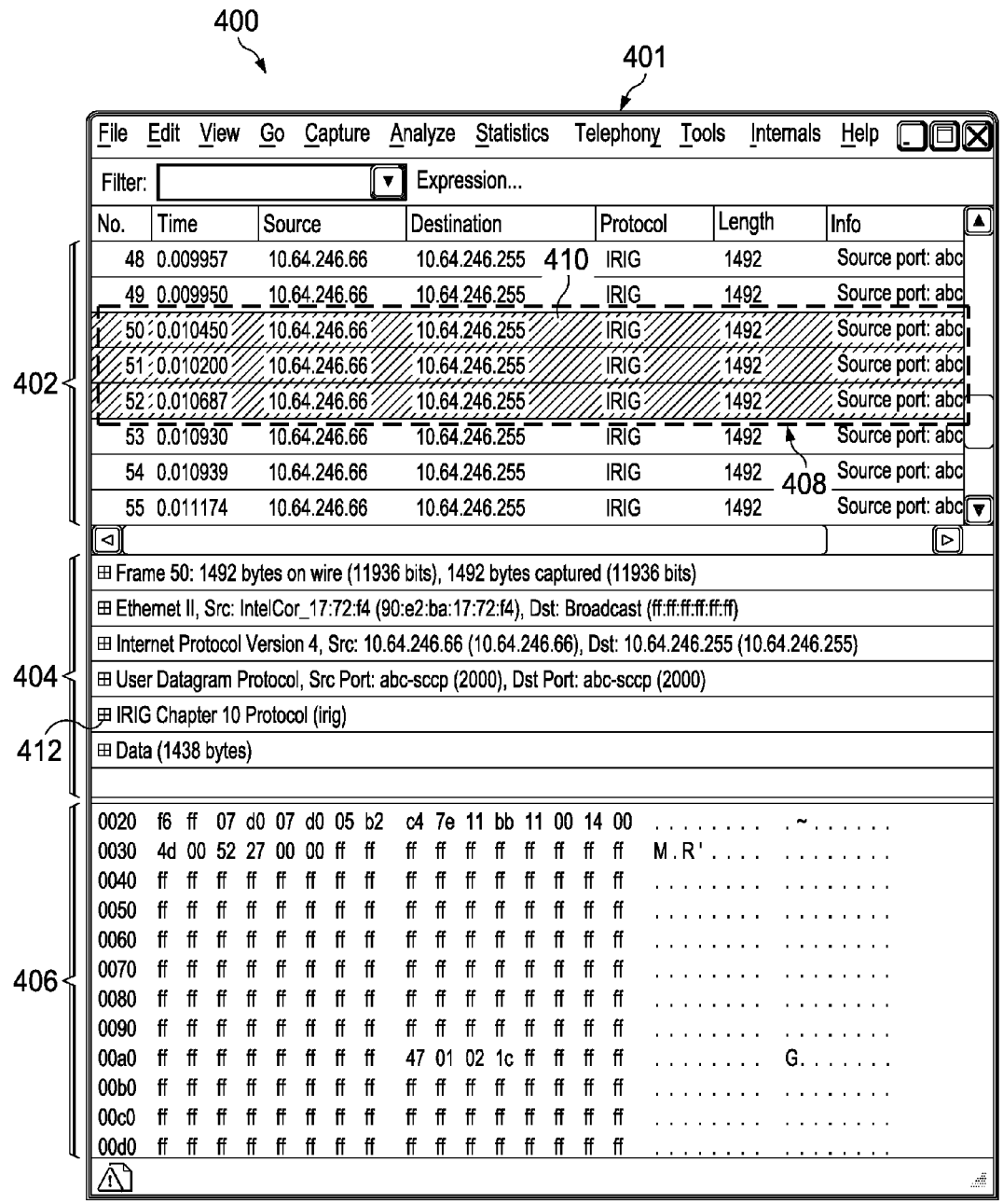
FIG. 4 is an illustration of another display of a graphical user interface in accordance with an illustrative embodiment.

With reference now to FIG. 4, an illustration of another display of a graphical user interface is depicted in accordance with an illustrative embodiment. Display 400 may be of a graphical user interface associated with a data analyzer, such as graphical user interface 153 associated with data analyzer 100 in FIG. 1.

Display 400 includes window 401, which may be similar to window 201 in FIG. 2. Window 401 may include data packet section 402, human-readable section 404, and hexadecimal data section 406. In this illustrative example, group of data packets 408 are graphically-coded such that group of data packets 408 may be distinguished from the other data packets in data packet section 402. Data packet 410 may be one of group of data packets 408. Each of group of data packets 408 is graphically-coded according to rule 308 in FIG. 3, thereby indicating that each of group of data packets 408 is an out-of-sequence data packet.

As depicted, data packet 410 has been selected by a user such that human-readable information generated by the dissectors is displayed in human-readable section 404. Control 412 may be selected by a user to expand the human-readable information generated by the dissector corresponding to the Inter-Range Instrumentation Group protocol.

Figure 5:
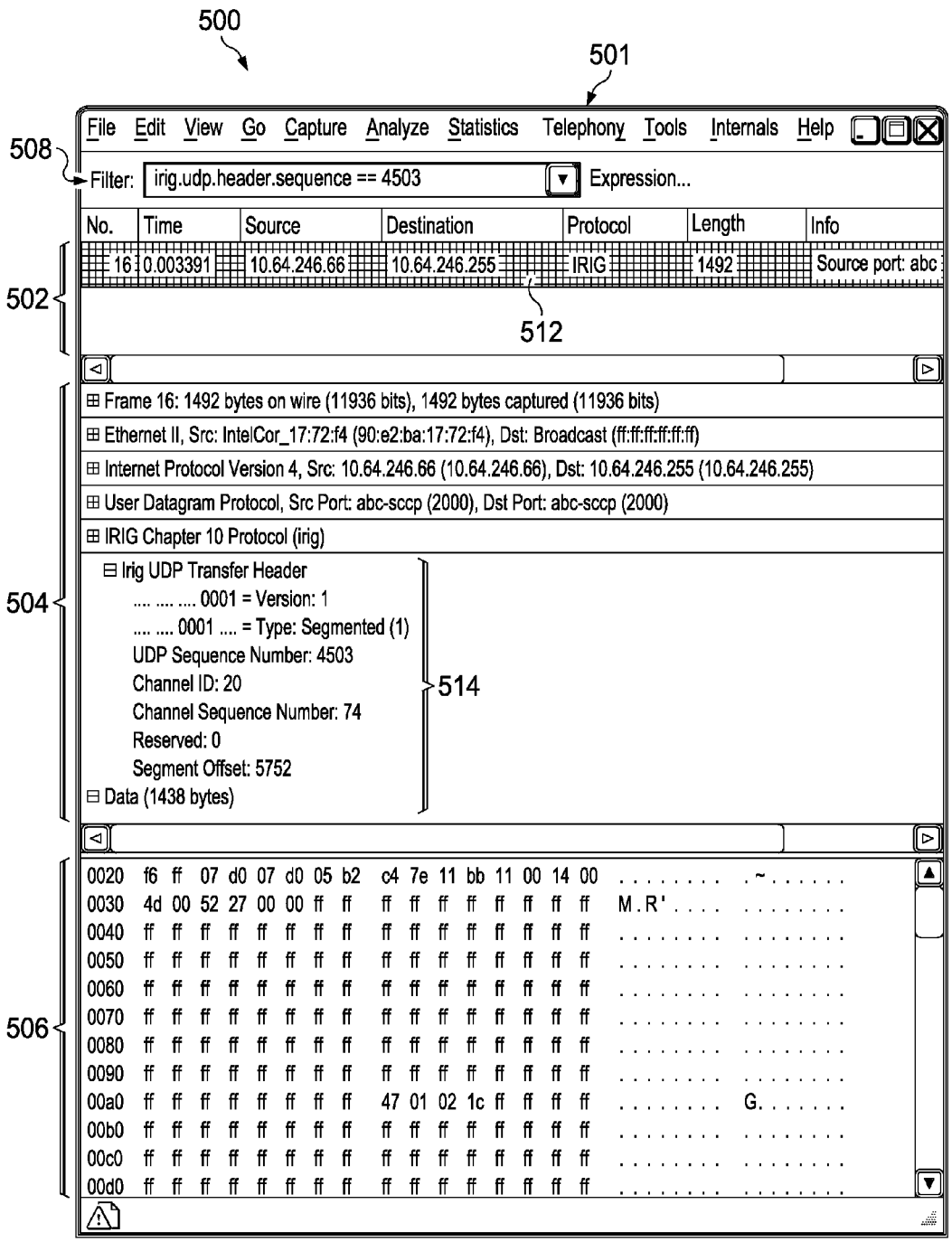
FIG. 5 is an illustration of another display of a graphical user interface in accordance with an illustrative embodiment.

With reference now to FIG. 5, an illustration of another display of a graphical user interface is depicted in accordance with an illustrative embodiment. Display 500 may be of a graphical user interface associated with a data analyzer, such as graphical user interface 153 associated with data analyzer 100 in FIG. 1.

Display 500 includes window 501, which may be similar to window 201 in FIG. 2. Window 501 may include data packet section 502, human-readable section 504, and hexadecimal data section 506. In this illustrative example, filter section 508 has been used to filter the data packets displayed in data packet section 502 such that only data packets having the User Datagram Protocol sequence number of 4503 are displayed. As depicted, only data packet 512 is displayed.

In response to a selection of data packet 512, human-readable information 514 for data packet 512 is displayed in human-readable section 504. Human-readable information 514 may be the portion of information generated by the dissector corresponding to the Inter-Range Instrumentation Group protocol.

The illustrations of displays 200, 300, 400, and 500 in FIGS. 2-5 are not meant to imply physical or architectural limitations to the manner in which an illustrative embodiment may be implemented. Other components in addition to or in place of the ones illustrated may be used. Some components may be optional.

Figure 6:
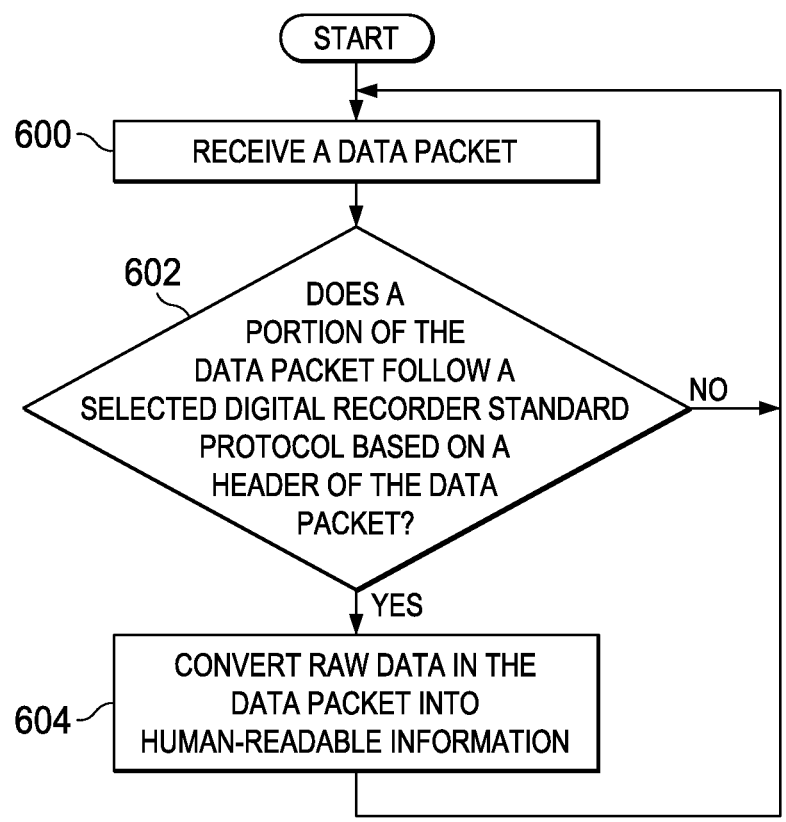
FIG. 6 is an illustration of a process for processing data packets in the form of a flowchart in accordance with an illustrative embodiment.

With reference now to FIG. 6, an illustration of a process for processing data packets is depicted in the form of a flowchart in accordance with an illustrative embodiment. The process illustrated in FIG. 6 may be implemented using data analyzer 100 in FIG. 1. In particular, this process may be implemented using dissector 112 in FIG. 1.

The process may begin by receiving a data packet (operation 600). Next, a determination is made as to whether a portion of the data packet follows a selected digital recorder standard protocol based on a header of the data packet (operation 602). This selected digital recorder standard protocol may be the Chapter 10 protocol of the Inter-Range Instrumentation Group Standard 106.

If a portion of the data packet follows the selected digital recorder standard protocol, raw data in the data packet is converted into human-readable information (operation 604). In other words, in operation 604, binary data in the data packet may be converted into human-readable information. In particular, binary data in the header of the data packet, which may also be referred to as binary header data, may be converted into human-readable header information. Thereafter, the process returns to operation 600 as described above. With reference again to operation 602, if no portion of the data packet follows the selected digital recorder standard protocol, the process returns to operation 600 as described above.

Figure 7:
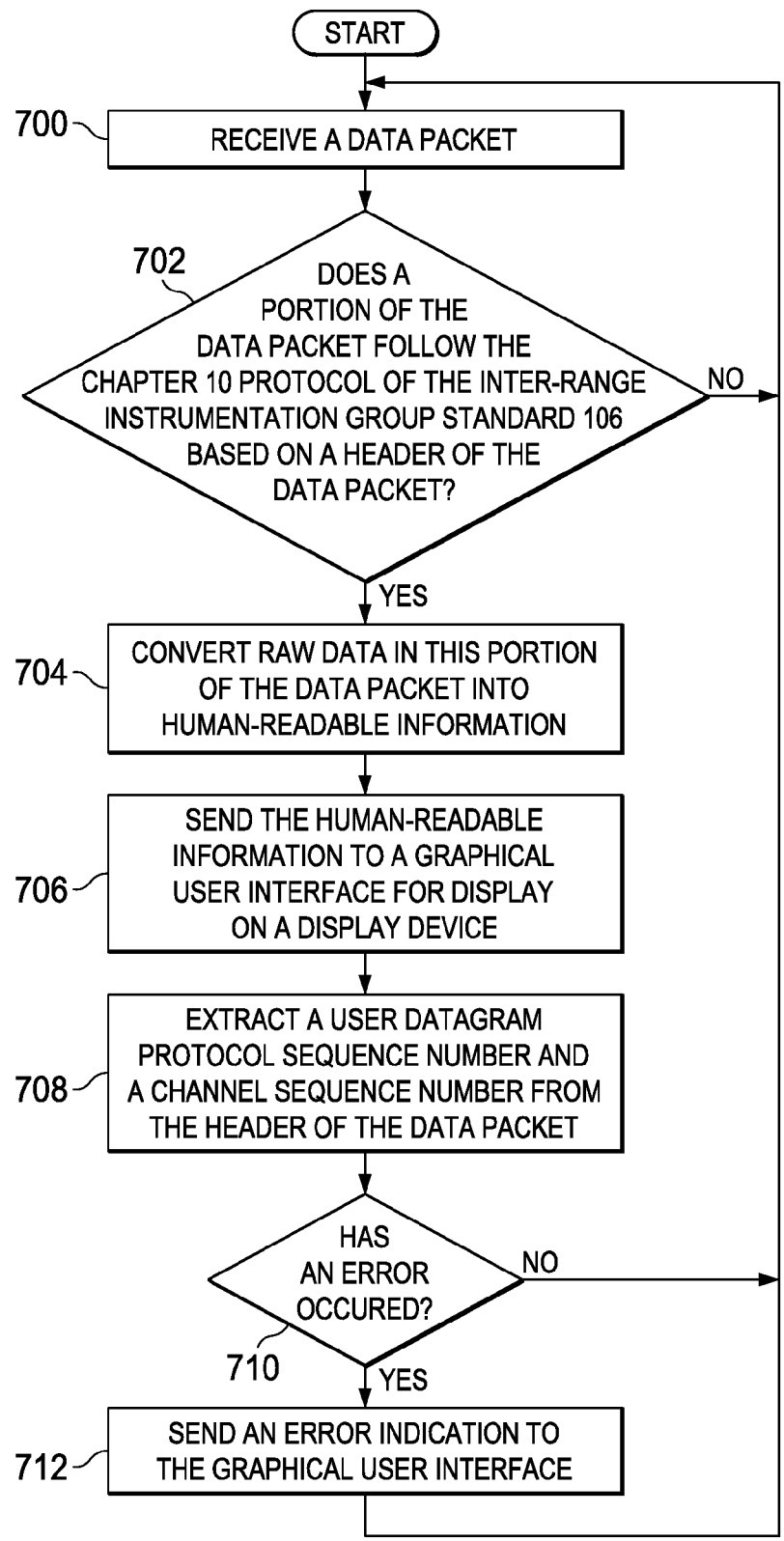
FIG. 7 is an illustration of a process for processing a data packet in the form of a flowchart in accordance with an illustrative embodiment.

With reference now to FIG. 7, an illustration of a process for processing a data packet is depicted in the form of a flowchart in accordance with an illustrative embodiment. The process illustrated in FIG. 7 may be implemented using data analyzer 100 in FIG. 1. In particular, this process may be implemented using dissector 112 in FIG. 1.

The process may begin by receiving a data packet (operation 700). Next, a determination is made as to whether a portion of the data packet follows the chapter 10 protocol of the Inter-Range Instrumentation Group Standard 106 based on a header of the data packet (operation 702). If a portion of the data packet follows the chapter 10 protocol of the Inter-Range Instrumentation Group Standard 106, raw data in this portion of the data packet is converted into human-readable information (operation 704). This raw data may be binary data in the header of the data packet. The human-readable information is then sent to a graphical user interface for display on a display device (operation 706).

A User Datagram Protocol sequence number and a channel sequence number are then extracted from the header of the data packet (operation 708). A determination is then made as to whether an error has occurred by evaluating the data packet with respect to the User Datagram Protocol sequence number and the channel sequence number (operation 710). If an error has occurred, an error indication is sent to the graphical user interface (operation 712), with the process then returning to operation 700 described above. Otherwise, if no error has occurred, the process returns directly to operation 700 described above.

With reference again to operation 702, if no portion of the data packet follows the chapter 10 protocol of the Inter-Range Instrumentation Group Standard 106, then the process returns to operation 700 as described above. In some cases, the data packet may then be sent to another dissector such that some other portion of the data packet following some other protocol may be decoded.

Figure 8:
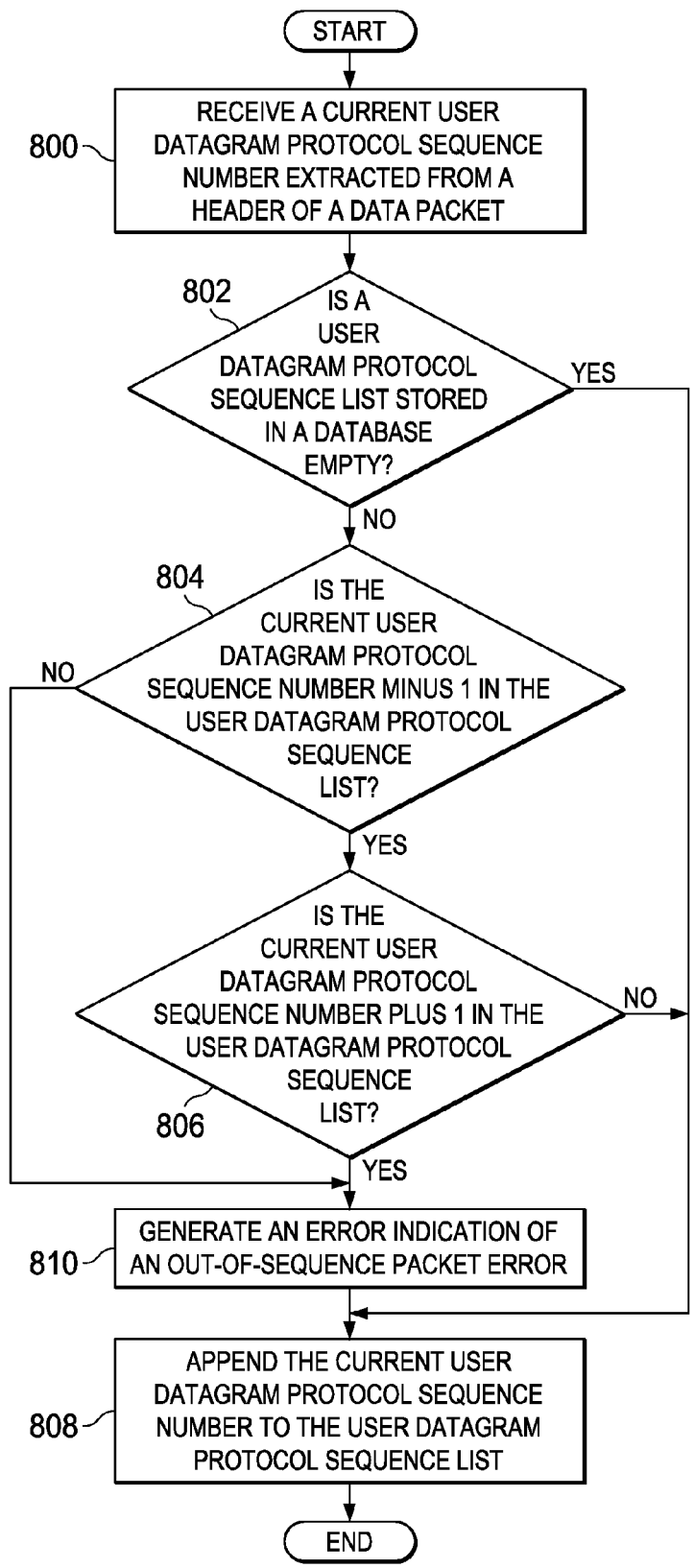
FIG. 8 is an illustration of a process for evaluating a data packet for an out-of-sequence packet error with respect to a User Datagram Protocol sequence in the form of a flowchart in accordance with an illustrative embodiment.

With reference now to FIG. 8, an illustration of a process for evaluating a data packet for an out-of-sequence packet error with respect to a User Datagram Protocol sequence is depicted in the form of a flowchart in accordance with an illustrative embodiment. The process illustrated in FIG. 8 may be implemented using dissector 112 in FIG. 1. In particular, this process may be implemented using error detector 116 in FIG. 1.

The process may begin by receiving a current User Datagram Protocol sequence number extracted from a header of a data packet (operation 800). Next, a determination is made as to whether a User Datagram Protocol sequence list stored in a database is empty (operation 802). If the User Datagram Protocol sequence list is not empty, a determination is made as to whether the current User Datagram Protocol sequence number minus 1 is in the User Datagram Protocol sequence list (operation 804).

If the current User Datagram Protocol sequence number minus 1 is in the User Datagram Protocol sequence list, a determination is made as to whether the current User Datagram Protocol sequence number plus 1 is in the User Datagram Protocol sequence list (operation 806). If the current User Datagram Protocol sequence number plus 1 is not in the User Datagram Protocol sequence list, the process appends the current User Datagram Protocol sequence number to the User Datagram Protocol sequence list (operation 808), with the process terminating thereafter.

With reference again to operation 806, if the current User Datagram Protocol sequence numbers plus 1 is in the User Datagram Protocol sequence list, the process generates an error indication of an out-of-sequence packet error (operation 810), with the process then proceeding to operation 808 as described above. With reference again to operation 804, if the current User Datagram Protocol sequence number minus 1 is not in the User Datagram Protocol sequence list, the process proceeds to operation 810. With reference again to operation 802, if the User Datagram Protocol sequence list is empty, the process proceeds to operation 808 as described above.

Figure 9:
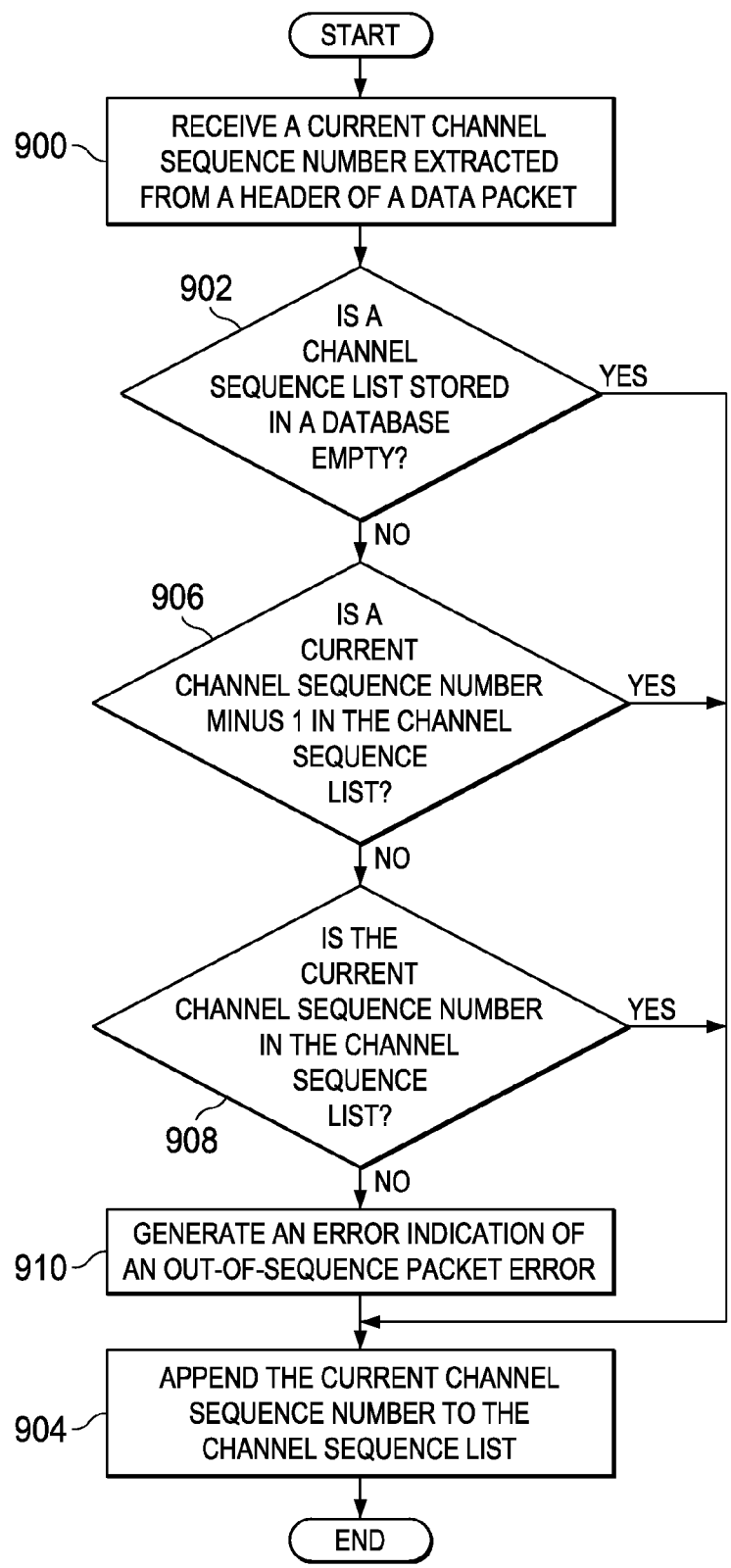
FIG. 9 is an illustration of a process for evaluating a data packet for an out-of-sequence packet error with respect to a channel sequence in the form of a flowchart in accordance with an illustrative embodiment.

With reference now to FIG. 9, an illustration of a process for evaluating a data packet for an out-of-sequence packet error with respect to a channel sequence is depicted in the form of a flowchart in accordance with an illustrative embodiment. The process illustrated in FIG. 9 may be implemented using dissector 112 in FIG. 1. In particular, this process may be implemented using error detector 116 in FIG. 1.

The process may begin by receiving a current channel sequence number extracted from a header of a data packet (operation 900). Next, a determination is made as to whether a channel sequence list stored in a database is empty (operation 902). If the channel sequence list is empty, then there is no error and the process appends the current channel sequence number to the channel sequence list (operation 904), with the process terminating thereafter.

However, with reference again to operation 902, if the channel sequence list is not empty, a determination is made as to whether a current channel sequence number minus 1 is in the channel sequence list (operation 906). If the current channel sequence number minus 1 is in the channel sequence list, the process proceeds to operation 904 as described above. Otherwise, a determination is made as to whether the current channel sequence number is in the channel sequence list (operation 908). If the current channel sequence number is in the channel sequence list, the process proceeds to operation 904 as described above. Otherwise, the process generates an error indication of an out-of-sequence packet error (operation 910), with process then proceeding to operation 904 as described above.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, a portion of an operation or step, some combination thereof.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 10:
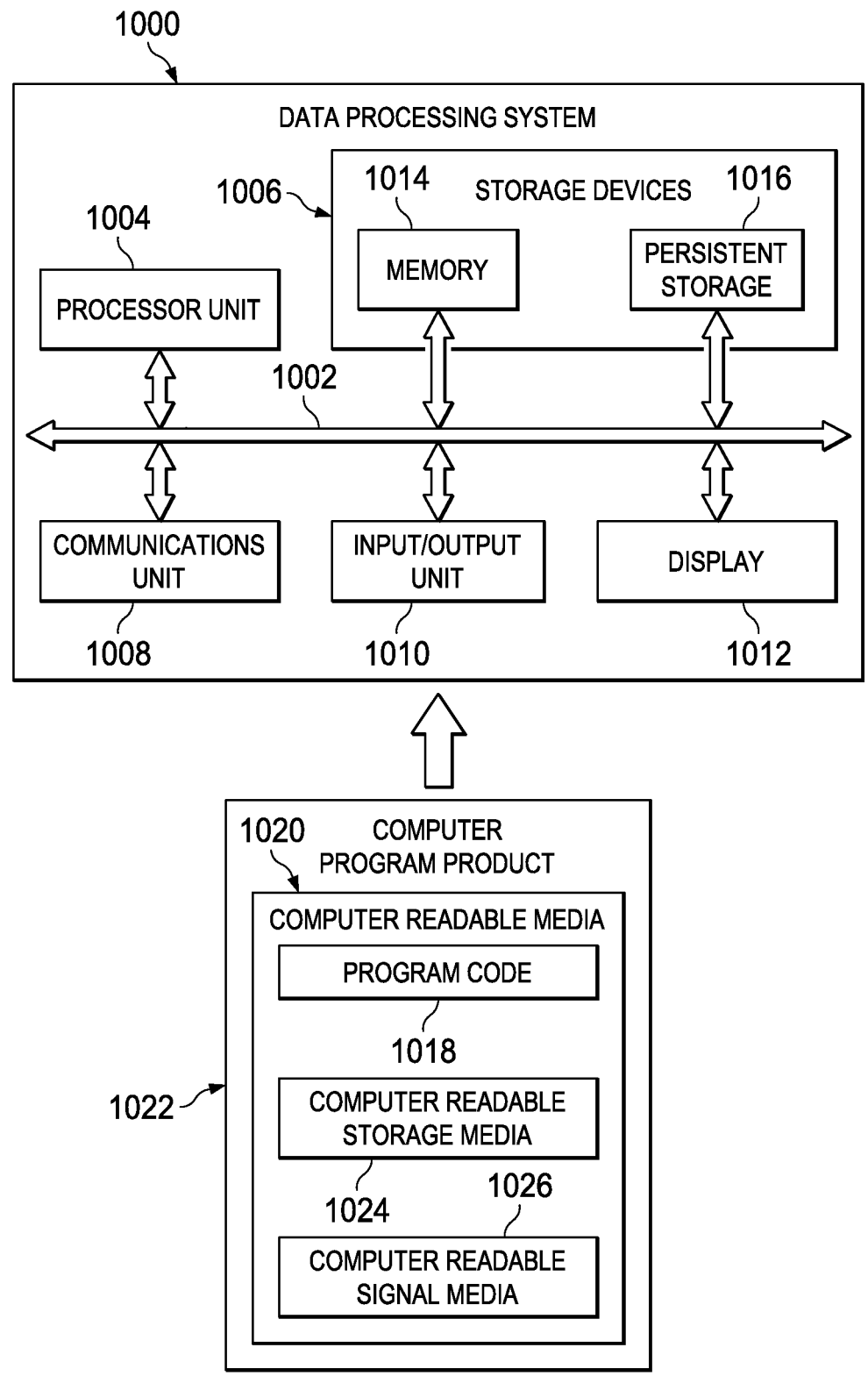
FIG. 10 is an illustration of a data processing system in the form of a block diagram in accordance with an illustrative embodiment.

Turning now to FIG. 10, an illustration of a data processing system is depicted in the form of a block diagram in accordance with an illustrative embodiment. Data processing system 1000 may be used to implement computer system 104 in FIG. 1. As depicted, data processing system 1000 includes communications framework 1002, which provides communications between processor unit 1004, storage devices 1006, communications unit 1008, input/output unit 1010, and display 1012. In some cases, communications framework 1002 may be implemented as a bus system.

Processor unit 1004 is configured to execute instructions for software to perform a number of operations. Processor unit 1004 may comprise at least one of a number of processors, a multi-processor core, or some other type of processor, depending on the implementation. In some cases, processor unit 1004 may take the form of a hardware unit, such as a circuit system, an application specific integrated circuit (ASIC), a programmable logic device, or some other suitable type of hardware unit.

Instructions for the operating system, applications and programs run by processor unit 1004 may be located in storage devices 1006. Storage devices 1006 may be in communication with processor unit 1004 through communications framework 1002. As used herein, a storage device, also referred to as a computer readable storage device, is any piece of hardware capable of storing information on a temporary basis, a permanent basis, or both. This information may include, but is not limited to, data, program code, other information, or some combination thereof.

Memory 1014 and persistent storage 1016 are examples of storage devices 1006. Memory 1014 may take the form of, for example, a random access memory or some type of volatile or non-volatile storage device. Persistent storage 1016 may comprise any number of components or devices. For example, persistent storage 1016 may comprise a hard drive, a flash memory, a rewritable optical disk, a rewritable magnetic tape, or some combination of the above. The media used by persistent storage 1016 may or may not be removable.

Communications unit 1008 allows data processing system 1000 to communicate with other data processing systems, devices, or both. Communications unit 1008 may provide communications using physical communications links, wireless communications links, or both.

Input/output unit 1010 allows input to be received from and output to be sent to other devices connected to data processing system 1000. For example, input/output unit 1010 may allow user input to be received through a keyboard, a mouse, some other type of input device, or a combination thereof. As another example, input/output unit 1010 may allow output to be sent to a printer connected to data processing system 1000.

Display 1012 is configured to display information to a user. Display 1012 may comprise, for example, without limitation, a monitor, a touch screen, a laser display, a holographic display, a virtual display device, some other type of display device, or a combination thereof.

In this illustrative example, the processes of the different illustrative embodiments may be performed by processor unit 1004 using computer-implemented instructions. These instructions may be referred to as program code, computer usable program code, or computer readable program code and may be read and executed by one or more processors in processor unit 1004.

In these examples, program code 1018 is located in a functional form on computer readable media 1020, which is selectively removable, and may be loaded onto or transferred to data processing system 1000 for execution by processor unit 1004. Program code 1018 and computer readable media 1020 together form computer program product 1022. In this illustrative example, computer readable media 1020 may be computer readable storage media 1024 or computer readable signal media 1026.

Computer readable storage media 1024 is a physical or tangible storage device used to store program code 1018 rather than a medium that propagates or transmits program code 1018. Computer readable storage media 1024 may be, for example, without limitation, an optical or magnetic disk or a persistent storage device that is connected to data processing system 1000.

Alternatively, program code 1018 may be transferred to data processing system 1000 using computer readable signal media 1026. Computer readable signal media 1026 may be, for example, a propagated data signal containing program code 1018. This data signal may be an electromagnetic signal, an optical signal, or some other type of signal that can be transmitted over physical communications links, wireless communications links, or both.

The illustration of data processing system 1000 in FIG. 10 is not meant to provide architectural limitations to the manner in which the illustrative embodiments may be implemented. The different illustrative embodiments may be implemented in a data processing system that includes components in addition to or in place of those illustrated for data processing system 1000. Further, components shown in FIG. 10 may be varied from the illustrative examples shown.

Thus, the illustrative embodiments provide a method and apparatus for processing data packets that are received over a network. In one illustrative example, a data packet may be received. A determination may be made as to whether a portion of the data packet follows a selected digital recorder standard protocol based on a header of the data packet. In this illustrative example, the selected digital recorder standard protocol may be an Inter-Range Instrumentation Group protocol, which may also be referred to as an "IRIG protocol." More specifically, the selected digital recorder standard protocol may be the Chapter 10 protocol of Standard 106 provided by the Inter-Range Instrumentation Group (IRIG). Raw data in the data packet may be converted into human-readable information in response to a determination that the portion of the data packet follows the selected digital recorder standard protocol. In one illustrative example, the raw data may include binary header data that is then converted into human-readable information.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a processor configured to implement:
      a decoder that converts raw data in a portion of a data packet that follows a selected digital recorder standard protocol into human-readable information; wherein the selected digital recorder standard protocol is a Chapter 10 protocol of Standard 106 provided by Inter-Range Instrument Group, wherein the decoder extracts a sequence number and a channel sequence number from a header of the data packet; and
      an error detector that detects whether an out-of-sequence packet error has occurred based on the sequence number and the channel sequence number.

2. The apparatus of claim 1 wherein
   the out-of-sequence packet error is an error in a number of selected errors; and
   the error detector determines whether one of the number of selected errors has occurred based on a header of the data packet.

3. The apparatus of claim 2, wherein the error detector generates an error indication in response to the determination that the one of the number of selected errors has occurred and sends the error indication to a graphical user interface.

4. The apparatus of claim 1, wherein the decoder sends the human-readable information to a graphical user interface for display on a display device.

5. The apparatus of claim 1, further comprising:
   a database storing a sequence list and a channel sequence list, wherein the sequence number is appended to the sequence list and the channel sequence number is appended to the channel sequence list.

6. A method for processing a plurality of data packets, the method comprising:
   receiving a data packet;

determining whether a portion of the data packet follows a selected digital recorder standard protocol based on a header of the data packet, wherein the selected digital recorder standard protocol is a Chapter 10 protocol of Standard 106 provided by Inter-Range Instrument Group;

converting raw data in the data packet into human-readable information in response to a determination that the portion of the data packet follows the selected digital recorder standard protocol;

extracting a sequence number and a channel sequence number from a header of the data packet; and determining whether an out-of-sequence packet error has occurred based on the sequence number and the channel sequence number.

7. The method of claim 6 further comprising:
repeating determining whether the portion of the data packet follows the selected digital recorder standard protocol based on the header of the data packet and converting the raw data in the data packet into the human-readable information in response to the determination that the portion of the data packet follows the selected digital recorder standard protocol for each of the plurality of data packets received in a data stream over a network.

8. The method of claim 6, wherein receiving the data packet comprises:
receiving the data packet after a dissector corresponding to a User Datagram Protocol has decoded another portion of the data packet that follows the User Datagram Protocol.

9. The method of claim 6 further comprising:
sending the human-readable information to a graphical user interface for display on a display device.

10. The method of claim 6, wherein the out-of-sequence packet error is an error in a number of selected errors, the method further comprising:
determining whether one of the number of selected errors has occurred based on the header of the data packet; and
generating an error indication in response to a determination that the one of the number of selected errors has occurred.

11. The method of claim 10, wherein determining whether the one of the number of selected errors has occurred comprises:
determining whether the out-of-sequence packet error has occurred with respect to a sequence.

12. The method of claim 10, wherein determining whether the one of the number of selected errors has occurred comprises:
determining whether the out-of-sequence packet error has occurred with respect to a channel sequence.

13. The method of claim 12 further comprising:
sending the error indication to a graphical user interface for display on a display device.

14. The method of claim 6, wherein receiving the data packet comprises:
receiving the data packet over a network.

* * * * *